United States Patent [19]
Whitmer

[11] Patent Number: 5,604,850
[45] Date of Patent: Feb. 18, 1997

[54] METHOD AND SYSTEM FOR DYNAMICALLY GENERATING COMPUTER INSTRUCTIONS FOR PERFORMING A LOGICAL OPERATION ON BITMAPS

[75] Inventor: Charles Whitmer, Redmond, Wash.

[73] Assignee: Microsoft Corporation, Redmond, Wash.

[21] Appl. No.: 909,248

[22] Filed: Jul. 6, 1992

[51] Int. Cl.$^6$ .................................................. G06T 11/00
[52] U.S. Cl. .......................................... 395/135; 395/133
[58] Field of Search ................................... 395/133–135, 395/129–132, 141, 164, 166; 345/187

[56] References Cited

U.S. PATENT DOCUMENTS

| | | | |
|---|---|---|---|
| 4,799,056 | 1/1989 | Hattori et al. | 345/187 |
| 4,823,281 | 4/1989 | Evangelisti et al. | 395/135 |
| 5,041,992 | 8/1991 | Cunningham et al. | 395/135 |
| 5,241,625 | 8/1993 | Epard et al. | 395/163 |
| 5,313,227 | 5/1994 | Aoki et al. | 395/135 X |

OTHER PUBLICATIONS

Petzold, *Programming Windows*, 2nd ed., Microsoft Press, Washington, 1990, pp. 615–624.

*Primary Examiner*—Almis R. Jankus
*Attorney, Agent, or Firm*—Seed and Berry LLP

[57] ABSTRACT

A method and system for generating a set of computer instructions to implement a logical operation to be performed on a plurality of bitmaps. A Boolean equation is specified that has a plurality of terms that use Boolean operations. Subsets of computer instructions are generated that implement each of the Boolean operations of the terms. When executing a routine to display a bitmap (bitBLT routine), a logical operation and a plurality of bitmaps are specified. The routine determines which of the generated subsets of computer instructions are needed to implement the specified logical operation. The determined subsets of computer instructions are then retrieved and combined to form the set of computer instructions that implements a logical operation. The set of computer instructions can then be executed to effect a display of a bitmap with the specified logical operation.

85 Claims, 5 Drawing Sheets

DISPLAY MEMORY

METHOD AND SYSTEM FOR DYNAMICALLY GENERATING COMPUTER INSTRUCTIONS FOR PERFORMING A LOGICAL OPERATION ON BITMAPS

TECHNICAL FIELD

This invention relates generally to a computer system for displaying bitmaps, and more particularly, a method and apparatus for combining multiple bitmaps.

BACKGROUND OF THE INVENTION

The output devices of personal computers often include bitmap graphics devices. A bitmap graphics device typically includes a graphics adapter, which has a display memory, and a display screen. The bitmap graphics device inputs a bitmap to be displayed and then displays that bitmap on the display screen. A bitmap is a matrix of bits that defines an image that is to be displayed in a rectangular area on a display screen. Each bit in a bitmap corresponds to one picture element (pixel) on the display screen. To display computer output data, a bitmap graphics device reads the bitmap stored in the display memory and renders the corresponding image on the display screen. If a bit in the display memory is 1, then the bitmap graphics device turns on the corresponding pixel on the display screen. If a bit in the display memory is 0, then the bitmap graphics device turns off the corresponding pixel on the display screen. By changing the contents of the display memory, for instance, by loading a new bitmap, a computer program can effect a change on the display screen.

A computer program typically generates a bitmap in program memory, and then copies the bitmap to the display memory. Copying from program memory to display memory can be relatively time-consuming because bitmaps are often quite large and can contain one million or more bits. To improve performance and facilitate computer programming, typical graphically-oriented operating systems provide routines that are optimized to copy bitmaps from program memory to display memory. These routines are known as bit block-transfer (bitBLT) routines. In general, these bitBLT routines can read as input a source bitmap and a destination bitmap, which is typically in display memory. These bitBLT routines copy the source bitmap to the destination bitmap in an efficient manner.

BitBLT routines are optimized to copy a computer word of data at a time, rather than just a single bit at a time. A computer word is a number of bits that the computer operates on as a unit. Computer words typically comprise 8, 16, or 32 bits.

FIGS. 1A and 1B are diagrams of a display memory showing the results of various bitBLT operations. FIG. 1A shows the display memory before executing the bitBLT routine, and FIG. 1B shows the display memory after executing the bitBLT routine. FIGS. 1C and 1D are diagrams of the display screen corresponding to FIGS. 1A and 1B, respectively.

Figure 2:
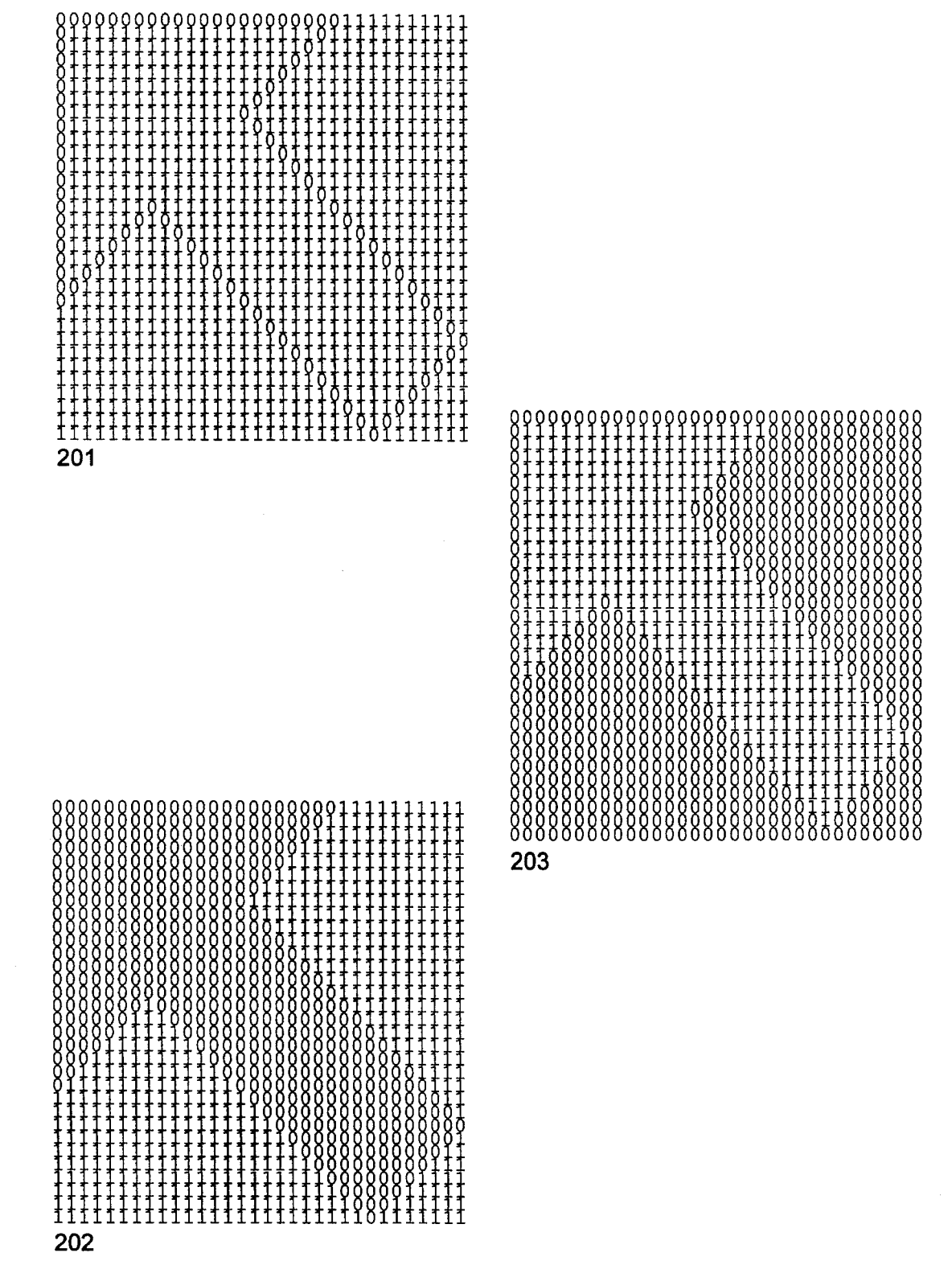

FIG. 2 is a diagram showing sample source bitmaps of an image of an arrow. The outlined arrow bitmap 201 is a matrix of bits that is 32 bits high by 32 bits wide. To display the outlined arrow bitmap 201 on the display screen at location 111, a program, when calling a bitBLT routine, would specify that the outlined arrow bitmap 201 is the source bitmap and specify that the display memory bitmap 101 is the destination bitmap corresponding to location 111 on the display screen. The bitBLT routine then copies the outlined arrow bitmap 201 to the display memory bitmap 101. When the outlined arrow bitmap 201 is copied to the display memory bitmap 101, the bits in the 32 by 32 bit matrix in the display memory bitmap 101 are overwritten by the outlined arrow bitmap 201 as shown by display memory bitmap 105. To display the solid arrow bitmap 202 on the display screen at location 112, a program would specify that the solid arrow bitmap 202 is the source bitmap and specify that the display memory bitmap 102 is the destination bitmap corresponding to location 112 on the display screen. The bitBLT routine then copies the solid arrow bitmap 202 to the display memory bitmap 102. The bits in the 32 by 32 bit matrix in the display memory bitmap 102 are overwritten by the solid arrow bitmap 202, as shown by display memory bitmap 106.

In certain situations, a program may want to display an arrow that is transparent. A transparent arrow is shown displayed at location 117 on the display screen. The transparent arrow is an arrow in which the underlying screen display is left intact except for the outline of the arrow. To provide this capability, typical bitBLT routines, in addition to copying bitmaps, permit Boolean logic operations to be performed on a bit-by-bit basis on the source and destination bitmaps. For example, to generate the transparent arrow as shown at location 117, the program specifies the outlined arrow bitmap 201 as the source bitmap, the display memory bitmap 103 as the destination bitmap, and the AND operation when invoking the bitBLT routine. The bitBLT routine retrieves each bit from the outlined arrow bitmap 201 and the corresponding bit from the display memory bitmap 103, performs the AND operation on the bits, and stores the result in the display memory bitmap 103, resulting in the display memory bitmap 107.

Although the bitBLT routines that perform copying and Boolean operations on source and destination bitmaps provide considerable flexibility, there are certain computer graphics operations that require invoking these bitBLT routines more than once. For example, if a program were to output an arrow as shown at location 118, the program would first invoke the bitBLT routine specifying the solid arrow bitmap 202 as the source bitmap, the display memory bitmap 104 as the destination bitmap, and the AND operation. The program would then invoke the bitBLT routine specifying the arrow bitmap 203 as the source bitmap, the display memory bitmap 104 as the destination bitmap, and the exclusive-OR operation. The invoking of the bitBLT routine twice results in each bit in the destination bitmap 108 being read from and written to twice. When a destination bitmap is large, the reading and writing of each bit twice can result in unacceptable performance.

Because copying large bitmaps can be expensive, typical bitBLT routines have been generalized to allow two source bitmaps to be designated, along with a destination bitmap and a Boolean operation. For example, to generate the arrow at location 118, the invoking program would designate solid arrow bitmap 202 as the first source bitmap ($S_1$), arrow bitmap 203 as the second source bitmap ($S_2$), and display memory bitmap 104 as the destination bitmap (D), along with Boolean operations that specify $S_1$ is to be logically ANDed with D, and that the result is to be logically exclusive-ORed with $S_2$. In standard Boolean algebra notation, that function would be specified as:

$$(S_1 \& D) \oplus S_2$$

where & represents the Boolean AND operator and where $\oplus$ represents the Boolean exclusive-OR operator.

Although it is possible to develop bitBLT routines that provide Boolean operations on an arbitrary number of source bitmaps, in practice, bitBLT routines typically support only two source bitmaps. When two source bitmaps are designated, the three bitmaps $S_1$, $S_2$, and D can be combined using Boolean operators in 256 unique ways. Each way of combining the three bitmaps is referred to as a logical operation or a raster operation.

TABLE I

| $S_1$ | 1 | 1 | 1 | 1 | 0 | 0 | 0 | 0 | |
|---|---|---|---|---|---|---|---|---|---|
| $S_2$ | 1 | 1 | 0 | 0 | 1 | 1 | 0 | 0 | Boolean |
| D | 1 | 0 | 1 | 0 | 1 | 0 | 1 | 0 | Function |
| Result: | 0 | 0 | 0 | 0 | 0 | 0 | 0 | 0 | 0 |
| | 0 | 0 | 0 | 1 | 0 | 0 | 0 | 1 | $(S_2|D)'$ |
| | 0 | 0 | 1 | 1 | 0 | 0 | 1 | 1 | $S_2'$ |
| | 0 | 1 | 0 | 0 | 0 | 1 | 0 | 0 | $S_2$ & D' |
| | 0 | 1 | 0 | 1 | 0 | 1 | 0 | 1 | D' |
| | 0 | 1 | 0 | 1 | 1 | 0 | 1 | 0 | $S_1 \oplus D$ |
| | 0 | 1 | 1 | 0 | 0 | 1 | 1 | 0 | $S_2 \oplus D$ |
| | 0 | 1 | 1 | 0 | 1 | 1 | 0 | 0 | $(S_2 \& D) \oplus S_1$ |
| | 1 | 0 | 0 | 0 | 1 | 0 | 0 | 0 | $S_2 \& D$ |
| | 1 | 0 | 1 | 1 | 1 | 0 | 1 | 1 | $S_1'|D$ |
| | 1 | 1 | 0 | 0 | 0 | 0 | 0 | 0 | $S_2 \& S_1$ |
| | 1 | 1 | 0 | 0 | 1 | 1 | 0 | 0 | $S_2$ |
| | 1 | 1 | 1 | 0 | 1 | 1 | 1 | 0 | $S_2|D$ |
| | 1 | 1 | 1 | 1 | 0 | 0 | 0 | 0 | $S_1$ |
| | 1 | 1 | 1 | 1 | 0 | 1 | 1 | 1 | $S_2'|S_1|D$ |
| | 1 | 1 | 1 | 1 | 1 | 1 | 1 | 1 | 1 |

Table I shows a subset of the 256 logical operations which designate how the $S_1$, $S_2$, and D bitmaps can be combined. The column entitled "Boolean Function" shows the Boolean function, comprised of bitmaps and Boolean operators, which generates the corresponding result.

TABLE II

| $S_1$ | $S_2$ | D | $S_1$ & D | $(S_1$ & $D) \oplus S_2$ |
|---|---|---|---|---|
| 0 | 0 | 0 | 0 | 0 |
| 0 | 0 | 1 | 0 | 0 |
| 0 | 1 | 0 | 0 | 1 |
| 0 | 1 | 1 | 0 | 1 |
| 1 | 0 | 0 | 0 | 0 |
| 1 | 0 | 1 | 1 | 1 |
| 1 | 1 | 0 | 0 | 1 |
| 1 | 1 | 1 | 1 | 0 |

For example, to generate display memory bitmap 108, the program specifies the bit string "01101100" (hexadecimal $6C_H$) as the logical operation to be performed. The logical operation $6C_H$ specifies the result for each of the eight possible combination of values for $S_1$, $S_2$, and D. Table II shows the values of the input bitmaps and the intermediate and final results achieved by the Boolean function corresponding to logical operation $6C_H$.

TABLE III

```
for h = 0, Height
    for w = 0, Width
        D[h,w] = (S1[h,w] & D[h,w]) ⊕ S2[h,w]
    endfor
endfor
```

Table III illustrates pseudocode for the bitBLT routine that implements the logical operation $6C_H$. The variable Height represents the number of rows in each bitmap and the variable Width represents the number of columns of bits in each bitmap divided by the word width. In this example, the width of each bitmap is assumed to be an integral number of computer words.

TABLE IV

| | | MOV | h, height | |
|---|---|---|---|---|
| | outerloop: | MOV | w, width | |
| | innerloop: | MOV | di, $S_1$[h,w] | common |
| | | MOV | si, $S_2$[h,w] | |
| | | MOV | dx, D[h,w] | |
| logical | | MOV | ax, di | |
| operation- | — | AND | ax, dx | |
| specific | | XOR | ax, si | |
| | | MOV | D[h,w], ax | |
| | | DEC | w | |
| | | JNZ | innerloop | common |
| | | DEC | h | |
| | | JNZ | outerloop | |

Table IV shows Intel 80386 assembly language pseudocode that implements the logical operation $6C_H$. Typical prior art bitBLT routines may have a separate section of code to implement each of the 256 logical operations. However, some bitBLT routine implementations recognize that a portion of the code is common to all logical operations and a portion of the code is logical operation-specific. As shown in Table IV, the three middle statements are the logical operation-specific code for the logical operation $6C_H$. In this code, these three statements load the ax register with $S_1$ bitmap, logically AND the D bitmap into the ax register, and then logically exclusive-OR the $S_2$ bitmap with the ax register. The five statements preceding and the five statements following the logical operation-specific code control the looping through the bitmaps and are common to all logical operations.

To improve performance, prior art bitBLT routines store the logical operation-specific code for each of the 256 logical operations in a table and store just one copy of the common code. When the bitBLT routine is called with a logical operation designation, such as $6C_H$, the bitBLT routine generates the code to implement the logical operation by retrieving the appropriate logical operation-specific code from the table and combining the retrieved code with the common code. The bitBLT routine then executes the generated code to perform the logical operation. The process of generating the code to execute is referred to as bitBLT compiling.

These prior art bitBLT routines generate efficient code at execution time. However, these routines require the storage of 256 logical operation-specific code segments. In addition, it can take considerable programming effort to develop and test these 256 code segments.

SUMMARY OF THE INVENTION

It is an object of the present invention to provide a method and system for generating efficient code for a bitBLT routine.

It is another object of the present invention to provide a method and system developing a bitBLT routine that reduces the of number code segments that need to be stored.

It is another object of the present invention to provide an apparatus for performing logical operations on a plurality of bitmaps.

These and other objects, which will become apparent as the invention is more fully described below, are obtained by a method and system for generating computer code to implement logical operations to be performed on a plurality of bitmaps. In a preferred embodiment, a Boolean equation is specified having a plurality of terms defined by Boolean operations. Code segments are generated that implement each of the Boolean operations of the terms. When executing a bitBLT routine, a logical operation and a plurality of bitmaps are specified. The bitBLT routine determines which of the generated code segments are needed to implement the specified logical operation. The determined code segments are then retrieved and combined to form the computer code that implements a logical operation. The computer code can then be executed to effect a bitBLT with a logical operation.

BRIEF DESCRIPTION OF THE DRAWINGS

FIG. 2 is a diagram showing sample source bitmaps of an image of an arrow.

DETAILED DESCRIPTION OF THE INVENTION

Figure 1A:
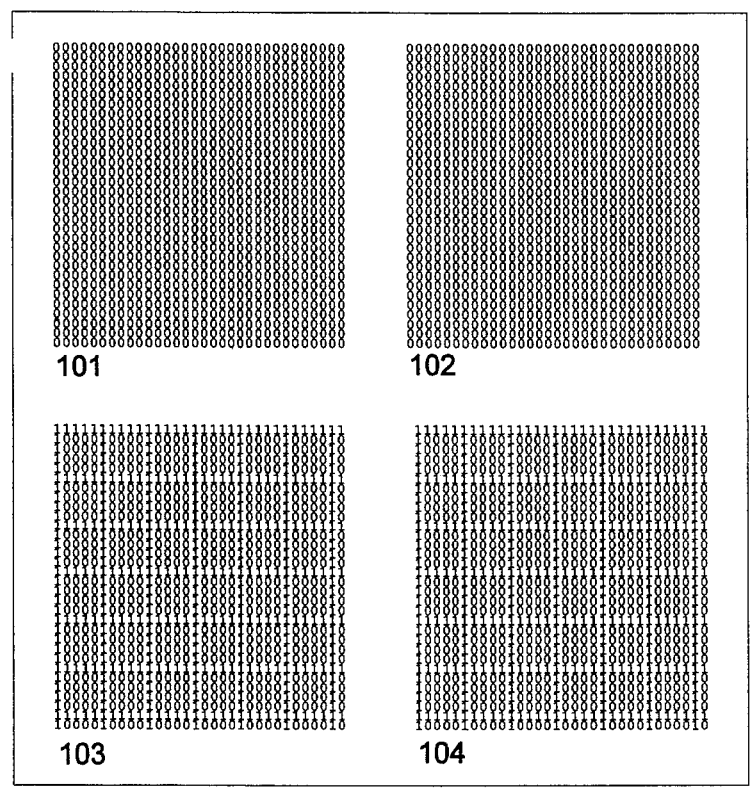
FIGS. 1A and 1B are diagrams of a display memory showing the results of various bitBLT operations.
Figure 1B:
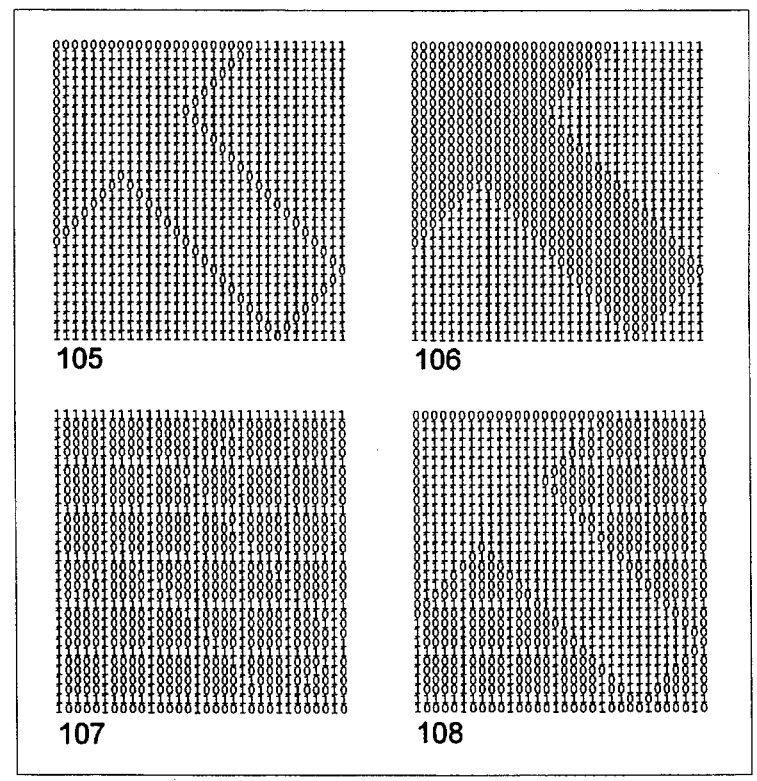
Figure 1C:
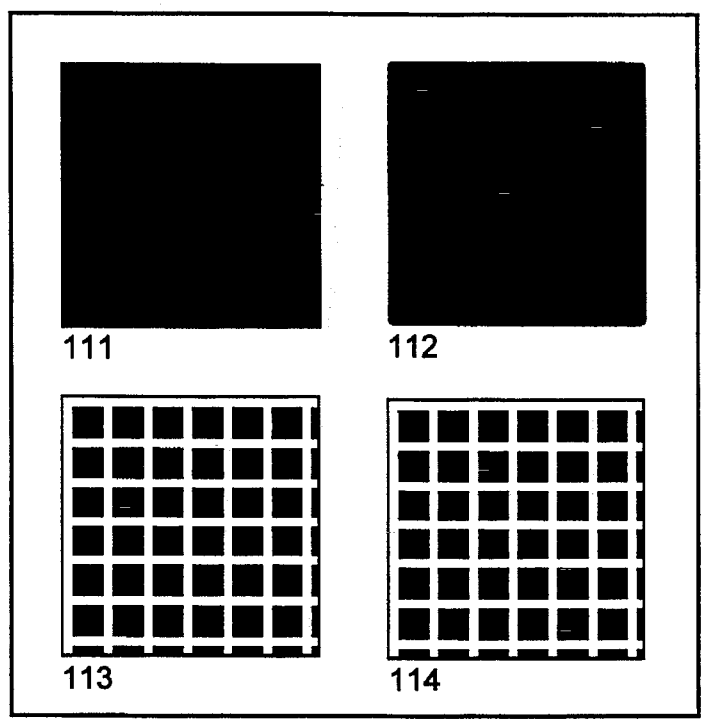
FIGS. 1C and 1D are diagrams of the display screen corresponding to FIGS. 1A and 1B, respectively.
Figure 1D:
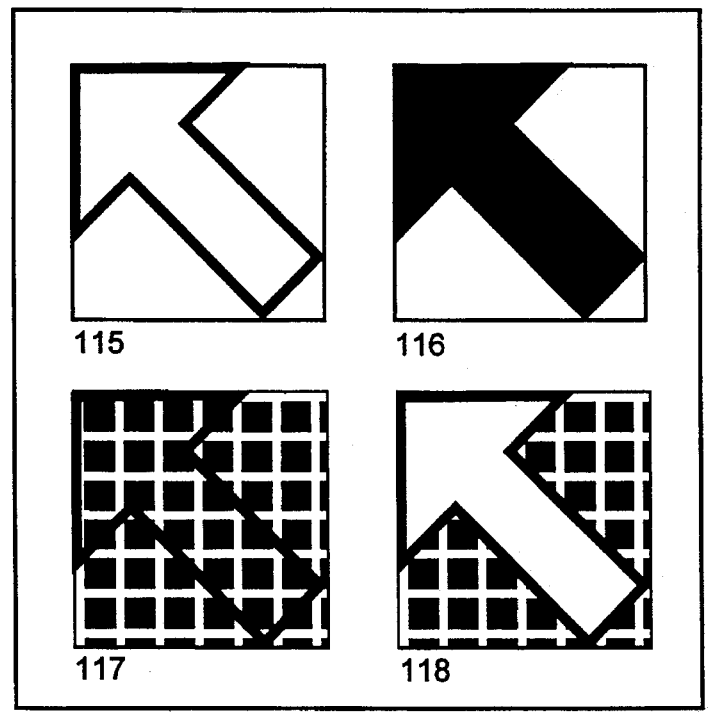

The present invention provides a method and system for implementing a bitBLT routine which reduces the storage requirements of the routine and provides for more rapid developing of the routine. In a preferred embodiment, a bitBLT routine that accommodates two source bitmaps and a destination bitmap stores 8 code segments and a mapping table, rather than the 256 logical operation-specific code segments used in prior art systems.

The present invention recognizes that each of the 256 logical operations can be represented by the following equation:

$$F(S_1, S_2, D) = \alpha_0 \cdot 1 \oplus \alpha_1 \cdot S_1 \oplus \alpha_2 \cdot S_2 \oplus \alpha_3 \cdot D \oplus \alpha_4 \cdot S_1 S_2 \oplus \alpha_5 \cdot S_1 D \oplus \alpha_6 \cdot S_2 D \oplus \alpha_7 \cdot S_1 S_2 D \quad \text{Equation 1}$$

where $\alpha_0 \ldots \alpha_7$ are logical operation-specific coefficients of the equation, where $\oplus$ represents the Boolean exclusive-OR operator, where · or juxtaposition represent the Boolean AND operator, and where logical 1, $S_1, \ldots, S_1 S_2 D$ are the 8 terms of the equation referred to as terms 0 through 7.

Each one of the 256 logical operations can be represented by Equation 1 with a unique set of coefficients. For example, the logical operation $6C_H$ can be represented by the set of coefficients $\alpha_0 = 0$, $\alpha_1 = 0$, $\alpha_2 = 1$, $\alpha_3 = 0$, $\alpha_4 = 0$, $\alpha_5 = 1$, $\alpha_6 = 0$, $\alpha_7 = 0$ ($00100100_2$ or $24_H$). The following equation shows the logical operation $6C_H$ as expressed in Equation 1 with the coefficients 24H:

$$F6C_H(S_1, S_2, D) = 0 \cdot 1 \oplus 0 \cdot S_1 \oplus 1 \cdot S_2 \oplus 0 \cdot D \oplus 0 \cdot S_2 \oplus 1 \cdot S_1 D \oplus 0 \cdot S_2 D \oplus 0 \cdot S_1 S_2 D \quad \text{Equation 2}$$

Since the value 0 logically ANDed with any other value results in 0, the above equation can be simplified to the following equation:

$$F6C_H(S_1, S_2, D) = S_2 \oplus S_1 D \quad \text{Equation 3}$$

For each of the 256 logical operations, there is a unique set of coefficients which generate the logical operation.

In a preferred embodiment, the present invention stores 8 code segments, one for each term in Equation 1, and stores the coefficients to each of the 256 logical operations into a mapping table called a coefficient table. When the bitBLT routine receives a logical operation, it retrieves the coefficients corresponding to the logical operation designator from a coefficient table, retrieves the code segments corresponding to the terms with a coefficient equal to 1, and combines the retrieved code segments with common code to generate the compiled code.

TABLE V

| | |
|---|---|
| CodeSeg[0] | NOT ax |
| CodeSeg[1] | XOR ax,di |
| CodeSeg[2] | XOR ax,si |
| CodeSeg[3] | XOR ax,dx |
| CodeSeg[4] | MOV bx,di |
| | AND bx,si |
| | XOR ax,bx |
| CodeSeg[5] | MOV bx,di |
| | AND bx,dx |
| | XOR ax,bx |
| CodeSeg[6] | MOV bx,si |
| | AND bx,dx |
| | XOR ax,bx |
| CodeSeg[7] | MOV bx,di |
| | AND bx,si |
| | AND bx,dx |
| | XOR ax,bx |

Table V shows eight Intel 80386 assembly language code segments which correspond to each of the eight terms of Equation 1. The common code is the same as used in prior systems, except that the ax register is cleared before the logical operation specific-code is executed.

Continuing with the above example, when the bitBLT routine receives the logical operation $6C_H$, it uses the $6C_H$ as an index into the coefficient table to retrieve the value $24_H$, which represents the set of coefficients to be applied to Equation 1. The bitBLT routine then retrieves the code segments for term 2 and term 5 (the coefficient $24_H$ indicating that coefficients $\alpha_2$ and $\alpha_5$ are set to 1) and combines those code segments with the common code to form the compiled code. Table VI shows the logical operation-specific code generated for logical operation $6C_H$.

In a preferred embodiment, the present invention also stores eight alternate code segments, one for each term in Equation 1. When the bitBLT routine retrieves code segments, the first code segment of the complied code is an alternate code segment. The alternate code segments are optimized to be the first code segment executed as part of the compiled code. In particular, the first code segments store the value of the term into the ax register, rather than exclusively ORing the value of the term into the ax register. Thus, it is not necessary to load the ax register with a zero value in the common code, except when the coefficients are "00000000" which indicate that none of the code segments are to be used and the result is 0. Also, the use of alternate code segments produces smaller compiled code and improved performance. Alternate Table V shows Intel 80386 assembly language code for the eight alternate code segments.

ALTERNATIVE TABLE V

| | |
|---|---|
| AltCodeSeg[0] | MOV ax,0FFFFh |
| AltCodeSeg[1] | MOV ax,di |
| AltCodeSeg[2] | MOV ax,si |
| AltCodeSeg[3] | MOV ax,dx |
| AltCodeSeg[4] | MOV ax,di |

ALTERNATIVE TABLE V-continued

|  | AND ax,si |
| --- | --- |
| AltCodeSeg[5] | MOV ax,di |
|  | AND ax,dx |
| AltCodeSeg[6] | MOV ax,si |
|  | AND ax,dx |
| AltCodeSeg[7] | MOV ax,di |
|  | AND ax,si |
|  | AND ax,dx |

TABLE VI

| CodeSeg[2] | [ | XOR | ax,si |
| --- | --- | --- | --- |
|  |  | MOV | bx,di |
| CodeSeg[5] | us,5 | AND | bx,dx |
|  | [ | XOR | ax,bx |

Figure 3:
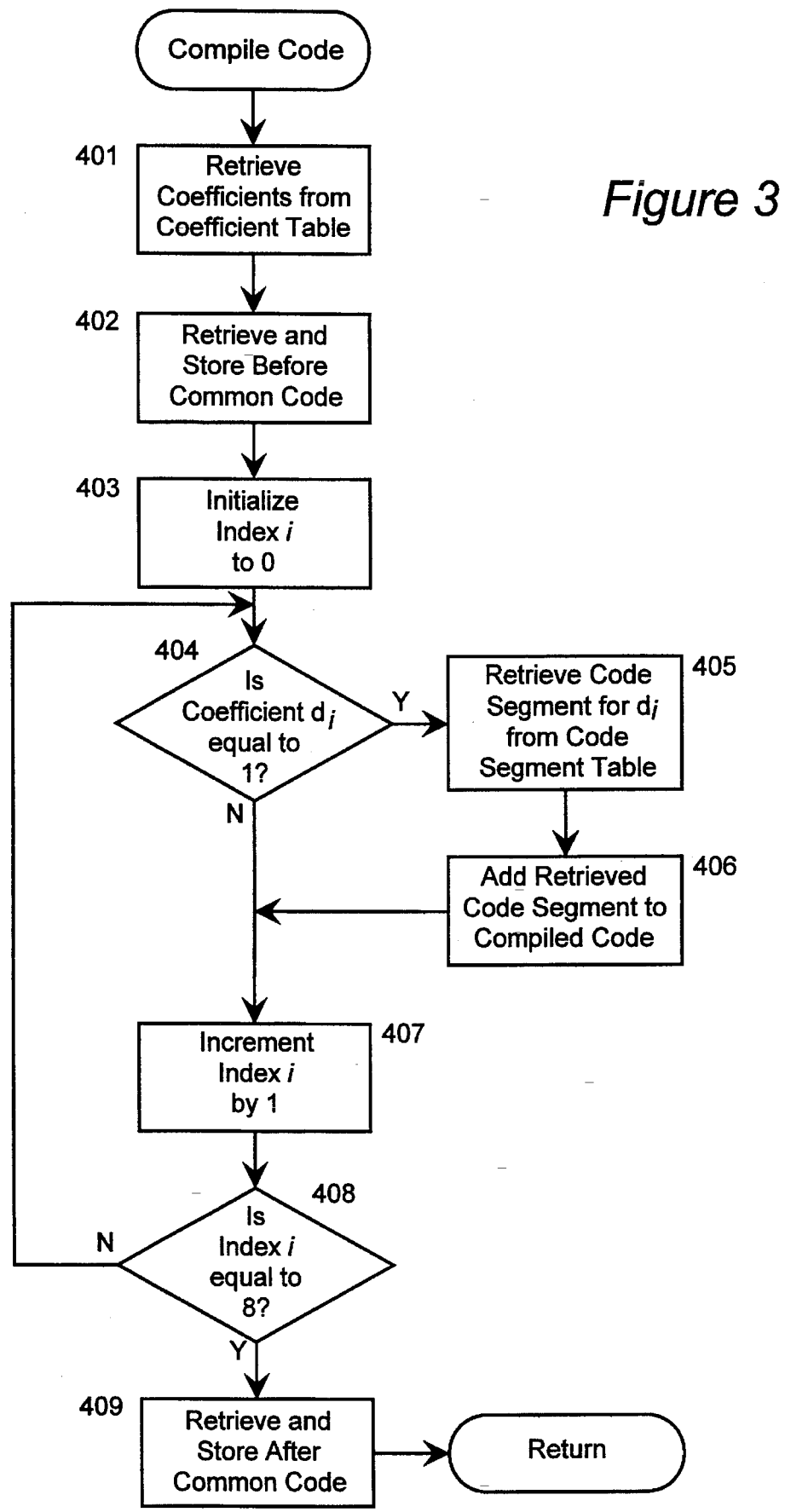
FIG. 3 is a flow diagram of a routine to generate the compiled code that is executed by the bitBLT routine.

FIG. 3 is a flow diagram of a routine to generate the compiled code that is executed by the bitBLT routine. This routine inputs a logical operation and generates the compiled code which implements the logical operation. Table VI shows the compiled code that is generated when the logical operation is $6C_H$. The routine uses the common code, the code segment table, and the coefficient table. In step 401, the routine retrieves the coefficients from the coefficient table indexed by the logical operation. The coefficient table contains one entry for each of the 256 logical operations. Each entry contains the coefficients that implement the logical operation for Equation 1.

TABLE VII

| | | |
|---|---|---|
| outerloop: | MOV h, height | |
| innerloop: | MOV w, width | |
| | MOV di,$S_1$[h,w] | Before |
| | MOV si,$S_2$[h,w] | Common |
| | MOV dx,D[h,w] | Code |
| | MOV ax,0 | |
| | XOR ax, si | Logical |
| | MOV bx, di | Operation |
| | AND bx, dx | $6C_H$ Code |
| | XOR ax, bx | |
| | MOV D[h,w], ax | |
| | DEC w | After |
| | JNZ inner loop | Common |
| | DEC h | Code |
| | JNZ outer loop | |

In step 402, the routine retrieves the Before Common Code as shown in Table VII and stores that code as part of the compiled code. In steps 403–408, the routine loops, determining whether each retrieved coefficient is a 0 or a 1. If the coefficient is a 1, then the routine retrieves the corresponding code segment from the code segment table of Table V and adds the retrieved code segment to the compiled code. In step 403, the routine initializes index i to 0. Index i is used to reference the coefficients and corresponding code segments. In step 404, if coefficient $\alpha_i$ is equal to 1, then the code segment for that coefficient is to be retrieved and the routine continues at step 405, else the routine continues at step 407. In step 405, the routine retrieves the code segment corresponding to coefficient $\alpha_i$ from the code segment table. In step 406, the routine adds the retrieved code segment to the compiled code. In step 407, the routine increments index i to point to the next coefficient. In step 408, if index i equals 8, then all the coefficients have been processed and the routine continues at step 409, else the routine loops to step 404 to check the next coefficient. In step 409, the routine retrieves the After Common Code as shown in Table VII and adds it to the compiled code. The routine then returns.

TABLE VIII

```
for α = 0, 255
    logical_op = 0
    for S₁ = 1, 0
        for S₂ = 1, 0
            for D = 1, 0
                logical_op =   logical_op * 2+(α₀ ⊕ α₁S₁⊕
                               α₂S₂ ⊕ α₃D ⊕α₄S₁S₂ ⊕
                               α₅S₁D ⊕ α₆S₂D ⊕ α₇S₁S₂D)
            endfor
        endfor
    endfor
    Coefficient_Table[logical_op] = α
endfor
```

In one embodiment, the coefficient table is generated by the algorithm shown in Table VIII. This algorithm generates a unique 8-bit logical operation for each of the 256 possible coefficients and then stores the coefficient in the coefficient table indexed by the logical operation. When the logical operation-specific code is generated, the logical operation is used as an index into the coefficient table to retrieve the corresponding coefficient.

In a preferred embodiment, the Before Common Code of Table VII is optimized to load only those bitmaps which are actually used by the logical operation-specific code. For example, if the logical operation $3C_H$ is specified, then the coefficient $60_H$ is retrieved from the coefficient table. The resulting minimized equation is:

$$F3C_H(S_1, S_2, D) = S_1 \oplus S_2$$

Since this equation does not use the D bitmap, the Before Common Code does not need to load the bits from the D bitmap into the dx register. The Before Common Code can thus be tailored so that the bits from the D bitmap are only loaded when coefficients 5, 6, or 7 are set. Similarly, the bits from the $S_1$ and $S_2$ bitmaps need only be loaded when their corresponding coefficients are set. In addition, typical bit-BLT routines check the validity of the $S_1$, $S_2$, and D bitmaps before executing the compiled code. If, however, a logical operation does not require the loading of the $S_1$ and $S_2$ bitmaps, then this validity checking does not need to be performed. The validity checking of the D bitmap typically needs to be performed as it is accessed when storing the result in the After Common Code.

Figure 4:
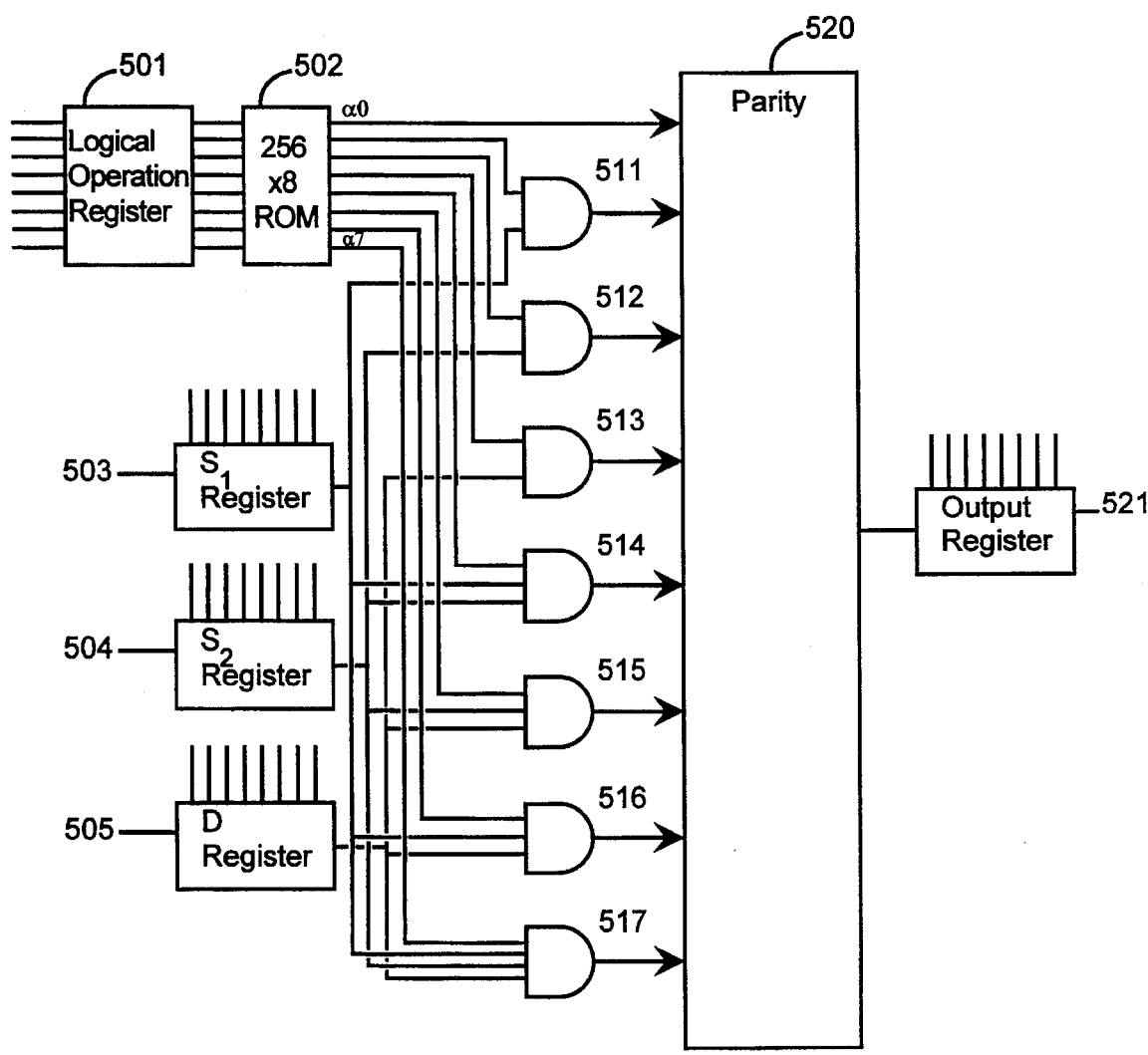
FIG. 4 is a schematic diagram of a hardware implementation of the present invention.

FIG. 4 is a schematic diagram of a hardware implementation of the present invention. The hardware includes logical operation register 501, coefficient table read-only memory (ROM) 502, parallel-to-serial shift registers 503, 504, and 505, AND gates 511–517, parity generator 520, and serial-to-parallel shift register 521. The logical operation register 501 outputs ($\alpha_0 \ldots \alpha_7$) address the coefficient table ROM 501, which is a 256×8 bit ROM. The coefficient table ROM contains the set of coefficients for Equation 1 generated by the pseudocode of Table VIII at the address corresponding to the logical operation. The dataline $\alpha_0$ is input to the parity generator 520 and datalines $\alpha_1$ through $\alpha_7$ are input to AND gates 511 through 517, respectively. The dataline $S_1$ from shift register 503 is input into AND gates 511, 514, 515, and 517. The dataline $S_2$ from shift register 504 is input into AND gates 512, 514, 516, and 517. The dataline D from shift register 505 is input into AND gates 513, 515, 516, and 517. The output from the AND gates 511 through 517 are input to the parity generator 520. The output of the parity generator 520 is input into the shift register 521.

In operation, logical operation register 501 is loaded with the logical operation to be performed. Coefficient table ROM 502 translates the logical operation to the corresponding coefficients. Shift registers 503, 504, and 505 are loaded with data from bitmaps $S_1$, $S_2$, and D, respectively. The AND gates 511–517 generate the results of seven of the terms of Equation 1 which are input into parity generator 520. The eighth term is generated by the $\alpha_0$ data line which is input directly into the parity generator 520. The parity generator 520 performs an equivalent of the logical exclusive-OR operations of Equation 1. The output of parity generator 520 is input into shift register 521. The logical operation is performed by sequentially loading shift registers 503, 504, 505 with data from bitmaps $S_1$, $S_2$, and D, respectively. The shift registers 503, 504, 505 are then shifted sequentially to datalines $S_1$, $S_2$, and D. For each shift of the shift registers 503, 504, 505, the output of parity generator 520 is the result of the logical operation stored in the logical operation register 501. The output of the parity generator 520 is input into the shift register 521, which stores the result of the logical operation, which can then be written to a display memory. In an alternate embodiment, the coefficient mapping is performed in software, and the coefficient table ROM 502 is not needed. Rather, the logical operation register 501 is loaded with the coefficients directly.

Although the function of Equation 1 is used in a preferred embodiment, one skilled in the art will appreciate that other equations of eight terms could be used as well. For example, the following equation:

$$F(S_1, S_2, D) = \lambda_0 S_1 S_2 D + \lambda_1 S_1 S_2 D' + \lambda_2 S_1 S_2'D + \lambda_3 S_1 S_2'D' + \lambda_4 S_1'S_2 D + \lambda_5 S_1'S_2 D' + \lambda_6 S_1'S_2'D + \lambda_7 S_1'S_2'D' \quad \text{Equation 4}$$

where $\lambda_0 \ldots \lambda_7$ represent the coefficients, where + represents the Boolean inclusive-OR operator, where ' indicates the Boolean complement operator, and where juxtaposition indicates the Boolean AND operator. A code segment is generated for each term of Equation 4. Using Equation 4, no translation is necessary to generate the coefficients. The coefficients correspond to the logical operation. When using Equation 4, similar optimizations can be used to determine whether to load certain bitmaps.

Although the present invention has been described in terms of preferred embodiments, it is not intended that the invention be limited to these embodiments. For example, the present invention can be used with color bitmaps (multiplanar) by applying the compiled code to each plane. In addition, one skilled in the art would recognize that the methods of the present invention can be applied to bitBLT routines that use more than two source bitmaps. For example, a bitBLT routine with three source bitmaps would use an equation of 16 terms and store 16 code segments, rather than the 65,536 logical operation specific-code segments that prior art methods would employ. Modifications within the spirit of the invention will be apparent to those skilled in the art. The scope of the present invention is defined by the claims that follow.

I claim:

1. A method of generating a set of computer instructions to implement a logical operation to be performed on a plurality of bitmaps, the method comprising the steps of:

specifying a Boolean equation, the equation having a plurality of terms, wherein each term has a corresponding coefficient;

for each term of the Boolean equation, generating a subset of computer instructions that implements the term;

storing each generated subset of computer instructions in a computer instructions table; and during execution of a computer program,
requesting a logical operation;

mapping the requested logical operation to a set of coefficients;

determining which stored subsets of computer instructions are needed to implement the requested logical operation based on the mapped set of coefficients;

retrieving the determined subsets of computer instructions from the computer instructions table; and combining the retrieved subsets of computer instructions to generate the set of computer instructions that implements the requested logical operation.

2. The method of claim 1 including the step of generating a coefficient table, and wherein the step of determining which stored subset of computer instructions are needed includes the step of retrieving the mapped set of coefficients from the coefficient table using the requested logical operation as an index into the coefficient table.

3. The method of claim 2 wherein the step of generating the coefficient table includes the steps of:

for each set of coefficients, determining a logical operation that the set of coefficients represents; and storing the set of coefficients in the coefficient table using the determined logical operation as an index into the coefficient table.

4. The method of claim 2 wherein the specified Boolean equation is $$F(S_1, S_2, D) = \alpha_0 \cdot 1 \oplus \alpha_1 \cdot S_1 \oplus \alpha_2 \cdot S_2 \oplus \alpha_3 \cdot D \oplus \alpha_4 \cdot S_1 S_2 \oplus \alpha_5 \cdot S_1 D \oplus \alpha_6 \cdot S_2 D \oplus \alpha_7 \cdot S_1 S_2 D;$$

wherein $\alpha_0 \ldots \alpha_7$ are logical operation-specific coefficients of the equation, where $\oplus$ represents the Boolean exclusive-OR operator, where $\cdot$ and juxtaposition represent the Boolean AND operator, where logical 1, $S_1, \ldots, S_1 S_2 D$ are terms of the equation, and where $S_1$, $S_2$, and D are bitmaps;

and wherein the step of generating the coefficient table comprises the following steps:

for each set of coefficients, wherein each coefficient in the set of coefficients is represented by $\alpha_i$, and where $i=1, 2, \ldots 8$;

initializing a saved logical operation number to 0;

for $S_1$=the values 1 and 0, for $S_2$=the values 1 and 0, for D=the values 1 and 0, evaluating the Boolean equation using the set of coefficients and the values of $S_1$, $S_2$, and D;

multiplying the saved logical operation number by 2; and adding the result of the evaluated Boolean equation to the multiplied saved logical operation; and storing the set of coefficients in the coefficient table using the saved logical operation number as in index into the coefficient table.

5. A method of generating a set of computer instructions to implement a logical operation to be performed on a plurality of bitmaps, the method comprising the steps of:

specifying a Boolean equation, the equation having a plurality of terms, wherein the specified Boolean equation describes all possible logical operations that can be performed on the bitmaps, and wherein the number of terms of the specified equation is less than the total number of possible logical operations;

for each term of the Boolean equation, generating a subset of computer instructions that implements the term;

storing each generated subset of computer instructions in a computer instructions table; and during execution of a computer program, requesting a logical operation;

determining which stored subsets of computer instructions are needed to implement the requested logical operation;

retrieving the determined subsets of computer instructions from the computer instructions table; and combining the retrieved subsets of computer instructions to generate the set of computer instructions that implements the requested logical operation.

6. A method of generating a set of computer instructions to implement a logical operation to be performed on a plurality of bitmaps, the method comprising the steps of:

specifying a Boolean equation, the equation having a plurality of terms wherein the specified Boolean equation is $$F(S_1, S_2, D) = \alpha_0 \cdot 1 \oplus \alpha_1 \cdot S_1 \oplus \alpha_2 \cdot S_2 \oplus \alpha_3 \cdot D \oplus \alpha_4 \cdot S_1 S_2 \oplus \alpha_5 \cdot S_1 D \oplus \alpha_6 \cdot S_2 D \oplus \alpha_7 \cdot S_1 S_2 D$$

wherein $\alpha_0 \ldots \alpha_7$ are logical operation-specific coefficients of the equation, where $\oplus$ represents the Boolean exclusive-OR operator, where $\cdot$ and juxtaposition represent the Boolean AND operator, where logical $1, S_1, \ldots, S_1 S_2 D$ are terms of the equation, and where $S_1$, $S_2$, and D are bitmaps;

for each term of the Boolean equation, generating a subset of computer instructions that implements the term;

storing each generated subset of computer instructions in a computer instructions table; and during execution of a computer program, requesting a logical operation;

determining which stored subsets of computer instructions are needed to implement the requested logical operation;

retrieving the determined subsets of computer instructions from the computer instructions table; and combining the retrieved subsets of computer instructions to generate the set of computer instructions that implements the requested logical operation.

7. A method of generating a set of computer instructions to implement a logical operation to be performed on a plurality of bitmaps, the method comprising the steps of:

specifying a Boolean equation, the equation having a plurality of terms wherein the specified Boolean equation is $$F(S_1, S_2, D) = \lambda_0 S_1 S_2 D + \lambda_1 S_1 S_2 D' + \lambda_2 S_1 S_2' D + \lambda_3 S_1 S_2' D' + \lambda_4 S_1' S_2 D + \lambda_5 S_1' S_2 D' + \lambda_6 S_1' S_2' D + \lambda_7 S_1' S_2' D'$$

wherein $\lambda_0 \ldots \lambda_7$ are logical operation-specific coefficients of the equation, where + represents the Boolean inclusive-OR operator, where juxtaposition represents the Boolean AND operator, where ' represents the Boolean complement operator, and where $S_1$, $S_2$, and D are bitmaps;

for each term of the Boolean equation, generating a subset of computer instructions that implements the term;

storing each generated subset of computer instructions in a computer instructions table; and during execution of a computer program, requesting a logical operation;

determining which stored subsets of computer instructions are needed to implement the requested logical operation;

retrieving the determined subsets of computer instructions from the computer instructions table; and combining the retrieved subsets of computer instructions to generate the set of computer instructions that implements the requested logical operation.

8. A method of generating a set of computer instructions to implement a logical operation to be performed on a plurality of bitmaps, the method comprising the steps of:

specifying a Boolean equation, the equation having a plurality of terms;

for each term of the Boolean equation, generating a subset of computer instructions that implements the term;

storing each generated subset of computer instructions in a computer instructions table; and during execution of a computer program, requesting a logical operation;

determining which stored subsets of computer instructions are needed to implement the requested logical operation;

retrieving the determined subsets of computer instructions from the computer instructions table; and combining the retrieved subsets of computer instructions to generate the set of computer instructions that implements the requested logical operation, wherein the stored subsets of computer instructions include alternative subsets of computer instructions for each term of the specified Boolean equation and wherein the alternative subsets of computer instructions are optimized to be a first subset of computer instructions of the combined subsets of computer instructions.

9. The method of claim 8 wherein the stored subsets of computer instructions use a result register, wherein the alternative subsets of computer instructions implement the terms by storing the value of each term directly in the result register without performing a Boolean operation on previous contents of the result register.

10. A method of generating a set of computer instructions to implement a logical operation to be performed on a plurality of bitmaps, each bitmap having a plurality of bits, the method comprising the steps of;

specifying a Boolean equation, the equation having a plurality of terms;

for each term of the Boolean equation, generating a subset of computer instructions that implements the term;

storing each generated subset of computer instructions in a computer instructions table; and during execution of a computer program, requesting a logical operation;

determining which stored subsets of computer instructions are needed to implement the requested logical operation;

retrieving the determined subsets of computer instructions from the computer instructions table;

combining the retrieved subsets of computer instructions to generate the set of computer instructions that implements the requested logical operation; and combining the generated set of computer instructions with stored computer instructions which are common to all logical operations, the common stored computer instructions for looping through bits of the bitmaps.

11. The method of claim 10 wherein the common stored computer instructions are optimized to use only the bitmaps required to implement the requested logical operation.

12. The method of claim 10 wherein the common stored computer instructions are optimized to validate only the bitmaps required to implement the requested logical operation.

13. A method for storing a set of computer instructions to implement logical operations on a plurality of inputs, the method comprising the steps of:

specifying an equation that represents a plurality of logical operations that can be performed on the inputs, the equation describing all possible logical operations that can be performed on the inputs, the equation having a plurality of terms where the number of terms is less than the total number of possible logical operations; and for each term of the equation,
  generating a subset of computer instructions that implements the term; and
  storing each generated subset of computer instructions in a computer instructions table so that certain subsets of the computer instructions can be retrieved, combined, and executed to perform a specified logical operation.

14. The method of claim 13 wherein each term has a corresponding coefficient and each logical operation is represented by a set of coefficients, and including the steps of specifying a logical operation to be performed on the plurality of inputs; and determining which stored subsets of computer instructions are needed to implement the specified logical operation based on the set of coefficients.

15. The method of claim 14 including the step of generating a coefficient table, and wherein the step of determining which stored subsets of computer instructions are needed includes the step of retrieving the set of coefficients from the coefficient table using the specified logical operation as an index into the coefficient table.

16. The method of claim 15 where the step of generating the coefficient table includes the steps of:

for each set of coefficients,
  determining a logical operation that the set of coefficients represents; and
  storing the set of coefficients in the coefficient table using the determined logical operation as an index into the coefficient table.

17. The method of claim 14, each input having a plurality of bits, and including the additional step of combining the determined subsets of computer instructions with stored computer instructions which are common to all logical operations, the common stored computer instructions being used to control looping through the bits.

18. The method of claim 17 wherein the common stored computer instructions are optimized to load only the input required by the specified logical operation.

19. The method of claim 17 wherein the common stored computer instructions are optimized to validate only the inputs required by the specified logical operation.

20. The method of claim 13 wherein the specified equation describes all possible logical operations that can be performed on the plurality of inputs.

21. The method of claim 13 wherein the specified equation is $$F(S_1, S_2, D) = \alpha_0 \cdot 1 \oplus \alpha_1 \cdot S_1 \oplus \alpha_2 \cdot S_2 \oplus \alpha_3 \cdot D \oplus \alpha_4 \cdot S_1 S_2 \oplus \alpha_5 \cdot S_1 D \oplus \alpha_6 \cdot S_2 D \oplus \alpha_7 \cdot S_1 S_2 D$$

wherein $\alpha_0 \ldots \alpha_7$ are logical operation-specific coefficients of the equation, where $\oplus$ represents the Boolean exclusive-OR operator, where $\cdot$ and juxtaposition represent the Boolean AND operator, where logical $1, S_1, \ldots, S_1 S_2 D$ are terms of the equation, and where $S_1$, $S_2$, and D are the input.

22. The method of claim 13 wherein the specified equation is $$F(S_1, S_2, D) = \lambda_0 S_1 S_2 D + \lambda_1 S_1 S_2 D' + \lambda_2 S_1 S_2' D + \lambda_3 S_1 S_2' D' + \lambda_4 S_1' S_2 D + \lambda_5 S_1' S_2 D' + \lambda_6 S_1' S_2' D + \lambda_7 S_1' S_2' D'$$

wherein $\lambda_0 \ldots \lambda_7$ are logical operation-specific coefficients of the equation, where + represents the Boolean inclusive-OR operator, where juxtaposition represents the Boolean AND operator, where ' represents the Boolean complement operator, and where $S_1$, $S_2$, and D are the input.

23. The method of claim 13 wherein the stored subsets of computer instructions include alternative subsets of computer instructions for each term of the specified equation and wherein the alternative subsets of computer instructions are optimized to be a first subset of computer instructions in the generated computer code.

24. The method of claim 23 wherein the stored subsets of computer instructions use a result register, where the optimization includes storing directly in the result register without performing an operation on the previous contents of the result register.

25. A method for storing a set of computer instructions to implement logical operations on a plurality of inputs, the method comprising the steps of:

specifying an equation that represents a plurality of logical operations that can be performed on the inputs, the equation describing all possible logical operations that can be performed on the inputs, the equation having a plurality of terms where the number of terms is less than the total number of possible logical operations, each term having a corresponding coefficient, each logical operation being represented by a set of coefficients;

generating a coefficient table;

for each term of the equation,
  generating a subset of computer instructions that implements the term; and
  storing each generated subset of computer instructions in a computer instructions table;

specifying a logical operation to be performed on the plurality of inputs; and determining which stored subset of computer instructions are needed to implement the specified logical operation base on the set of coefficients by retrieving the set of coefficients from the coefficient table using the specified logical operation as an index into the coefficient table.

26. The method of claim 25 where the step of generating the coefficient table includes the steps of:

for each set of coefficients,
  determining a logical operation that the set of coefficients represents; and
  storing the set of coefficients in the coefficient table using the determined logical operation as an index into the coefficient table.

27. A method for storing a set of computer instructions to implement logical operations on a plurality of inputs, each input having a plurality of bits, the method comprising the steps of:

specifying an equation that represents a plurality of logical operations that can be performed on the inputs, the equation describing all possible logical operations that can be performed on the inputs, the equation having a plurality of terms where the number of terms is less than the total number of possible logical operations, each term having a corresponding coefficient, each logical operation being represented by a set of coefficients;

for each term of the equation,
  generating a subset of computer instructions that implements the term; and storing each generated subset of computer instructions in a computer instructions table;

specifying a logical operation to be performed on the plurality of inputs; and determining which stored subset of computer instructions are needed to implement the specified logical operation base on the set of coefficients by combining the determined subsets of computer instructions with stored computer instructions which are common to all logical operations, the common stored computer instructions being used to control looping through the bits.

28. The method of claim 27 wherein the common stored computer instructions are optimized to load only the input required by the specified logical operation.

29. The method of claim 27 wherein the common stored computer instructions are optimized to validate only the inputs required by specified logical operation.

30. A method for storing a set of computer instructions to implement logical operations on a plurality of inputs, the method comprising the steps of:

specifying an equation that represents a plurality of logical operations that can be performed on the inputs, the equation describing all possible logical operations that can be performed on the inputs, the equation having a plurality of terms where the number of terms is less than the total number of possible logical operations, wherein the specified equation is $$F(S_1, S_2, D) = \alpha_0 \cdot 1 \oplus \alpha_1 \cdot S_1 \oplus \alpha_2 \cdot S_2 \oplus \alpha_3 \cdot D \oplus \alpha_4 \cdot S_1 S_2 \oplus \alpha_5 \cdot S_1 D \oplus \alpha_6 \cdot S_2 D \oplus \alpha_7 \cdot S_1 S_2 D$$

wherein $\alpha_0 \ldots \alpha_7$ are logical operation-specific coefficients of the equation, where $\oplus$ represents the Boolean exclusive-OR operator, where $\cdot$ and juxtaposition represent the Boolean AND operator, where logical $1, S_1, \ldots, S_1 S_2 D$ are terms of the equation, and where $S_1, S_2$, and D are the input; and for each term of the equation,
generating a subset of computer instructions that implements the term; and
storing each generated subset of computer instructions in a computer instruction table.

31. A method for storing a set of computer instructions to implement logical operations on a plurality of inputs, the method comprising the steps of:

specifying an equation that represents a plurality of logical operations that can be performed on the inputs, the equation describing all possible logical operations that can be performed on the inputs, the equation having a plurality of terms where the number of terms is less than the total number of possible logical operations, wherein the specified equation is $$F(S_1, S_2, D) = \lambda_0 S_1 S_2 D + \lambda_1 S_1 S_2 D' + \lambda_2 S_1 S_2' D + \lambda_3 S_1 S_2' D' + \lambda_4 S_1' S_2 D + \lambda_5 S_1' S_2 D' + \lambda_6 S_1' S_2' D + \lambda_7 S_1' S_2' S'$$

wherein $\lambda_0 \ldots \lambda_7$ are logical operation-specific coefficients of the equation, where + represents the Boolean inclusive-OR operator, where juxtaposition represents the Boolean AND operator, where ' represents the Boolean complement operator, and where $S_1, S_2$, and D are the input; and for each term of the equation,
generating a subset of computer instructions that implements the term; and
storing each generated subset of computer instructions in a computer instructions table.

32. A method for storing a set of computer instructions to implement logical operations on a plurality of inputs, the method comprising the steps of:

specifying an equation that represents a plurality of logical operations that can be performed on the inputs, the equation describing all possible logical operations that can be performed on the inputs, the equation having a plurality of terms where the number of terms is less than the total number of possible logical operations; and for each term of the equation,
generating a subset of computer instructions that implements the term; and
storing each generated subset of computer instructions in a computer instructions table wherein the stored subsets of computer instructions include alternative subsets of computer instructions for each term of the specified equation and wherein the alternative subsets of computer instructions are optimized to be a first subset of computer instructions in the generated computer code.

33. The method of claim 32 wherein the stored subsets of computer instructions use a result register, where the optimization includes storing directly in the result register without performing an operation on the previous contents of the result register.

34. A method for generating a set of computer instructions to implement logical operations on a plurality of inputs, the method comprising the steps of:

specifying an equation that represents a plurality of logical operations that can be performed on the inputs, the equation having a plurality of terms;

for each term of the equation, generating a subset of computer instructions that implements the term;

during execution of a computer program,
requesting a logical operation;
determining which generated subsets of computer instructions are needed to implement the requested logical operation;
retrieving the determining subsets of computer instructions; and
combining the retrieved subsets of computer instructions to generate the set of computer instructions that implements the requested logical operation.

35. The method of claim 34 wherein each term has a corresponding coefficient, wherein the logical operation represents a set of coefficients for the equation, and wherein the step of determining which generated subsets of computer, instructions are needed makes the determination based on the set of coefficients.

36. The method of claim 35 including the step of generating a coefficient table, and wherein the step of determining which generated subsets of computer instructions are needed includes the step of retrieving the set of coefficients from the coefficient table based on requested logical operation.

37. The method of claim 36 wherein the step of generating the coefficient table includes the steps of:

for each set of coefficients,
determining a logical operation that the set of coefficients represents; and
storing the set of coefficients in the coefficient table.

38. The method of claim 34 wherein the generated subsets of computer instructions include alternative subsets of computer instructions for each term of the specified equation and wherein the alternative subsets of computer instructions are optimized to be a first subset of computer instructions of the combined subsets of computer instructions.

39. The method of claim 38 wherein the generated subsets of computer instructions store a value of the term directly in the result register without performing a Boolean operation on previous contents of the result register.

40. The method of claim 34 wherein each input has a plurality of bits, and including the additional step of combining the generated set of computer instructions with computer instructions which are common to all logical operations, the common computer instructions being used to control looping through the bits of the input.

41. The method of claim 40 wherein the common computer instructions are optimized to load only the input required by the requested logical operation.

42. The method of claim 40 wherein the common computer instructions are optimized to validate only the input required by the requested logical operation.

43. The method of claim 34 wherein the specified equation describes all possible logical operations that can be performed on the plurality of inputs, and wherein the number of terms of the specified equation is less than the total number of possible logical operations.

44. The method of claim 34 wherein the specified equation is $$F(S_1, S_2, D) = \alpha_0 \cdot 1 \oplus \alpha_1 \cdot S_1 \oplus \alpha_2 \cdot S_2 \oplus \alpha_3 \cdot D \oplus \alpha_4 \cdot S_1 S_2 \oplus \alpha_5 \cdot S_1 D \oplus \alpha_6 \cdot S_2 D \oplus \alpha_7 \cdot S_1 S_2 D$$

wherein $\alpha_0 \ldots \alpha_7$ are logical operation-specific coefficients of the equation, where $\oplus$ represents the Boolean exclusive-OR operator, where $\cdot$ and juxtaposition represent the Boolean AND operator, where logical 1, $S_1, \ldots, S_1 S_2 D$ are terms of the equation, and where $S_1$, $S_2$, and D are bitmaps representing the plurality of input.

45. The method of claim 34 wherein the specified equation is the Boolean equation $$F(S_1, S_2, D) = \lambda_0 S_1 S_2 D + \lambda_1 S_1 S_2 D' + \lambda_2 S_1 S_2' D + \lambda_3 S_1 S_2' D' + \lambda_4 S_1' S_2 D + \lambda_5 S_1' S_2 D' + \lambda_6 S_1' S_2' D + \lambda_7 S_1' S_2' D'$$

wherein $\lambda_0 \ldots \lambda_7$ logical operation-specific coefficients of the equation, where + represents the Boolean inclusive-OR operator, where juxtaposition represent the Boolean AND operator, where ' represents the Boolean complement operator, and where $S_1$, $S_2$, and D are bitmaps representing the plurality of input.

46. A method for performing a logical operation on a plurality of inputs, the method comprising the steps of:

specifying a Boolean equation, the equation having a plurality of terms;

for each term of the Boolean equation, generating a subset of computer instructions that implements the term;

during execution of a computer program,
specifying a logical operation;
determining which generated subsets of computer instructions are needed to implement the requested logical operation; and
combining the determined subsets of computer instructions to generate a set of computer instructions that implements the specified logical operation; and
executing the generated set of computer instructions.

47. The method of claim 46 wherein the specified Boolean equation describes all possible logical operations that can be performed on the inputs, and wherein the number of terms of the specified Boolean equation is less than the total number of possible logical operations.

48. A method for generating a set of computer instructions to implement a logical operation to be performed on two source bitmaps, $S_1$ and $S_2$, and a destination bitmap, D, the method comprising the steps of:

generating a subset of computer instructions for each term of a Boolean equation that defines all possible 256 logical combinations of $S_1$, $S_2$, and D, the Boolean equation having 8 terms, each term having a Boolean operation and a corresponding subset of computer instructions that implements the Boolean operation; and during execution of a computer program, combining subsets of computer instructions that are needed to implement the logical operation to form the generated set of computer instructions.

49. An apparatus for performing a logical operation on a plurality of bitmaps, the apparatus having a subset of computer instructions that implements each term of a Boolean equation, the apparatus comprising:

means for identifying which subsets of computer instructions are needed to implement the logical operation, the means for identifying including means for specifying coefficients of the Boolean equation that implement the logical operation; and means for selecting subsets of computer instructions based on the specified coefficients;

means for combining the identified subsets of computer instructions into a set of computer instructions that implements the logical operation; and means for executing the set of computer instructions to perform the logical operation on the plurality of bitmaps.

50. An apparatus for performing a logical operation on a plurality of inputs, the apparatus comprising:

means for storing a plurality of subsets of computer instructions that implement each term of a Boolean equation, wherein the Boolean equation is $$F(S_1, S_2, D) = \lambda_0 S_1 S_2 D + \lambda_1 S_1 S_2 D' + \lambda_2 S_1 S_2' D + \lambda_3 S_1 S_2' D' + \lambda_4 S_1' S_2 D + \lambda_5 S_1' S_2 D' + \lambda_6 S_1' S_2' D + \lambda_7 S_1' S_2' D'$$

wherein $\lambda_0 \ldots \lambda_7$ are logical operation-specific coefficients of the equation, where + represents the Boolean inclusive-OR operator, where juxtaposition represents the Boolean AND operator, where ' represents the Boolean complement operator, and where $S_1$, $S_2$, and D are bitmaps;

means for identifying which stored subsets of computer instructions are needed to implement the logical operation;

means for combining the identified subsets of computer instructions into a set of computer instructions that implements the logical operation; and means for executing the set of computer instructions to perform the logical operation on the plurality of inputs.

51. The apparatus of claim 50 wherein the means for identifying includes means for specifying coefficients of the Boolean equation; and means for selecting subsets of computer instructions based on the specified coefficients.

52. An apparatus for performing a logical operation on a plurality of inputs, the apparatus comprising:

means for storing a plurality of subsets of computer instructions that implement each term of a Boolean equation wherein the Boolean equation is $$F(S_1, S_2, D) = \alpha_0 \cdot 1 \oplus \alpha_1 \cdot S_1 \oplus \alpha_2 \cdot S_2 \oplus \alpha_3 \cdot D \oplus \alpha_4 \cdot S_1 S_2 \oplus \alpha_5 \cdot S_1 D \oplus \alpha_6 \cdot S_2 D \oplus \alpha_7 \cdot S_1 S_2 D$$

wherein $\alpha_0 \ldots \alpha_7$ are logical operation-specific coefficients of the equation, where $\oplus$ represents the Boolean exclusive-OR operator, where $\cdot$ and juxtaposition represent the Boolean AND operator, where logical 1, $S_1, \ldots, S_1 S_2 D$ are terms of the equation, and where $S_1$, $S_2$, and D are bitmaps;

means for identifying which stored subsets of computer instructions are needed to implement the logical operation;

means for combining the identified subsets of computer instructions into a set of computer instructions that implements the logical operation; and means for executing the set of computer instructions to perform the logical operation on the plurality of inputs.

53. The apparatus of claim 52 wherein the means for identifying includes means for specifying coefficients of the Boolean equation; and means for selecting subsets of computer instructions based on the specified coefficients.

54. An apparatus for performing a logical operation on a plurality of inputs, the apparatus comprising:

means for storing a plurality of subsets of computer instructions that implement each term of a Boolean equation;

means for identifying which stored subsets of computer instructions are needed to implement the logical operation, the means for identifying including means or specifying coefficients of the Boolean equation that implement the logical operation; and means for selecting subsets of computer instructions based on the specified coefficients;

means for combining the identified subsets of computer instructions into a set of computer instructions that implements the logical operation; and means for executing the set of computer instructions to perform the logical operation on the plurality of inputs.

55. An apparatus for generating a value of a logical operation on a plurality of inputs, the apparatus comprising:

means for mapping a binary representation of the logical operation to a set of coefficients for the terms;

means for determining a result of each term of a Boolean equation based on the input and the mapped binary representation; and parity means for generating the parity of the results, the parity being the value for the logical operation.

56. An apparatus for performing a logical operation on a plurality of bits, comprising:

bit storage means for each of the plurality of bits, each bit storage means having an output serial line for outputting the bit;

means for storing coefficients of terms of a Boolean equation, the coefficients representing the logical operation to be performed on the bits, the means for storing having a plurality of input logical operation lines and a plurality of output coefficient lines, wherein when a logical operation is specified on the input logical operation lines, the coefficients for the specified logical operation are output to the output coefficient lines;

a plurality of logic gates for determining a result of each term of the Boolean equation, each logic gate with input term lines and an output term line, wherein the input term lines are connected to the output serial lines and to the output coefficient lines to effect generating the result of each term of the Boolean equation; and term combining means with input combining lines and an result line, the input combining lines being connected to the output term lines, the result line having a value which is a result combining the input combining lines, wherein the result represents the logical operation performed on the bits output on the output serial lines of the bit storage means.

57. The apparatus of claim 56 wherein the plurality of logic gates are logical-AND gates and the term combining means is a parity generator in which the result line is the parity of the input combining lines.

58. The apparatus of claim 56 wherein each bit storage means includes a shift register for receiving each bit of a bitmap in parallel and for shifting each bit of the bitmap in serial to effect the performing of logical operation on each of the bits of the bitmaps.

59. An apparatus for performing a logical operation on a plurality of bits, comprising:

bit storage means for each of the plurality of bits, each bit storage means having an output serial line for outputting the bits;

means for storing coefficients of terms of a Boolean equation, the coefficients representing the logical operation to be performed on the bits, the means for storing having a plurality of output coefficient lines;

a plurality of logic gates for determining a result of each term of the Boolean equation, each logic gate with input term lines and an output term line, wherein the input term lines are connected to the output serial lines and to the output coefficient lines to effect generating the result of each term of the Boolean equation, wherein the plurality of logic gates are logical-AND gates; and term combining means with input combining lines and an result line, the input combining lines being connected to the output term lines, the result line having a value which is a result combining the input combining lines, wherein the result represents the logical operation performed on the bits output on the output serial lines of the bit storage means, wherein the term combining means is a parity generator in which the result line is the parity of the input combining lines.

60. An apparatus for performing a logical operation on a plurality of bits, comprising:

bit storage means for each of the plurality of bits, each bit storage means having an output serial line for outputting the bit, wherein each bit storage means includes a shift register for receiving each bit of a bitmap in parallel and for shifting each bit of the bitmap in serial to effect the performing of the logical operation on each of the bits of the bitmaps;

means for storing coefficients of terms of a Boolean equation, the coefficients representing the logical operation to be performed on the bits, the means for storing having a plurality of output coefficient lines;

a plurality of logic gates for determining a result of each term of the Boolean equation, each logic gate with input term lines and an output term line, wherein the input term lines are connected to the output serial lines and to the output coefficient lines to effect generating the result of each term of the Boolean equation; and term combining means with input combining lines and an result line, the input combining lines being connected to the output term lines, the result line having a value which is a result combining the input combining lines, wherein the result represents the logical operation performed on the bits output on the output serial lines of the bit storage means.

61. A computer-readable medium containing instructions for causing a computer system to generate a set of computer instructions to implement a logical operation to be performed on a plurality of bitmaps, by:

specifying a Boolean equation, the equation having a plurality of terms, wherein the specified Boolean equation describes all possible logical operations that can be performed on the bitmaps, and wherein the number of terms of the specified equation is less than the total number of possible logical operations;

for each term of the Boolean equation, generating a subset of computer instructions that implements the term;

storing each generated subset of computer instructions in a computer instructions table; and during execution of a computer program,
- requesting a logical operation;
- determining which stored subsets of computer instructions are needed to implement the requested logical operation;
- retrieving the determined subsets of computer instructions from the computer instructions table; and
- combining the retrieved subsets of computer instructions to generate the set of computer instructions that implements the requested logical operation.

62. A computer-readable medium containing instructions for causing a computer system to store a set of computer instructions to implement logical operations on a plurality of inputs, by:

specifying an equation that represents a plurality of logical operations that can be performed on the inputs, the equation describing all possible logical operations that can be performed on the inputs, the equation having a plurality of terms where the number of terms is less than the total number of possible logical operations; and for each term of the equation,
- generating a subset of computer instructions that implements the term; and
- storing each generated subset of computer instructions in a computer instructions table so that certain subsets of the computer-instructions can be retrieved, combined, and executed to perform a specified logical operation.

63. The computer-readable medium of claim 62 wherein each term has a corresponding coefficient and each logical operation is represented by a set of coefficients, and including specifying a logical operation to be performed on the plurality of inputs; and determining which stored subsets of computer instructions are needed to implement the specified logical operation based on the set of coefficients.

64. The computer-readable medium of claim 63 including generating a coefficient table, and wherein the step of determining which stored subsets of computer instructions are needed includes retrieving the set of coefficients from the coefficient table using the specified logical operation as an index into the coefficient table.

65. The computer-readable medium of claim 64 wherein generating the coefficient table includes:

for each set of coefficients,
- determining a logical operation that the set of coefficients represents; and
- storing the set of coefficients in the coefficient table using the determined logical operation as an index into the coefficient table.

66. The computer-readable medium of claim 63, each input having a plurality of bits, and including combining the determined subsets of computer instructions with stored computer instructions which are common to all logical operations, the common stored computer instructions being used to control looping through the bits.

67. The computer-readable medium of claim 66 wherein the common stored computer instructions are optimized to load only the input required by the specified logical operation.

68. The computer-readable medium of claim 66 wherein the common stored computer instructions are optimized to validate only the inputs required by the specified logical operation.

69. The computer-readable medium of claim 62 wherein the specified equation describes all possible logical operations that can be performed on the plurality of inputs.

70. The computer-readable medium of claim 62 wherein the specified equation is $$F(S_1, S_2, D) = \alpha_0 \cdot 1 \oplus \alpha_1 \cdot S_1 \oplus \alpha_2 \cdot S_2 \oplus \alpha_3 \cdot D \oplus \alpha_4 \cdot S_1 S_2 \oplus \alpha_5 \cdot S_1 D \oplus \alpha_6 \cdot S_2 D \oplus \alpha_7 \cdot S_1 S_2 D$$

wherein $\alpha_0 \ldots \alpha_7$ are logical operation-specific coefficients of the equation, where $\oplus$ represents the Boolean exclusive-OR operator, where $\cdot$ and juxtaposition represent the Boolean AND operator, where logical $1, S_1, \ldots, S_1 S_2 D$ are terms of the equation, and where $S_1$, $S_2$, and D are the input.

71. The computer-readable medium of claim 62 wherein the specified equation is $$F(S_1, S_2, D) = \lambda_0 S_1 S_2 D + \lambda_1 S_1 S_2 D' + \lambda_2 S_1 S_2' D + \lambda_3 S_1 S_2' D' + \lambda_4 S_1' S_2 D + \lambda_5 S_1' S_2 D' + \lambda_6 S_1' S_2' D + \lambda_7 S_1' S_2' D'$$

wherein $\lambda_0 \ldots \lambda_7$ are logical operation-specific coefficients of the equation, where + represents the Boolean inclusive-OR operator, where juxtaposition represents the Boolean AND operator, where ' represents the Boolean complement operator, and where $S_1$, $S_2$, and D are the input.

72. The computer-readable medium of claim 62 wherein the stored subsets of computer instructions include alternative subsets of computer instructions for each term of the specified equation and wherein the alternative subsets of computer instructions are optimized to be a first subset of computer instructions in the generated computer code.

73. The computer-readable medium of claim 72 wherein the stored subsets of computer instructions use a result register, where the optimization includes storing directly in the result register without performing an operation on the previous contents of the result register.

74. A computer-readable medium containing instructions for causing a computer system to generate a set of computer instructions to implement logical operations on a plurality of inputs, by:

specifying an equation that represents a plurality of logical operations that can be performed on the inputs, the equation having a plurality of terms;

for each term of the equation, generating a subset of computer instructions that implements the term;

during execution of a computer program,
- requesting a logical operation;
- determining which generated subsets of computer instructions are needed to implement the requested logical operation;
- retrieving the determined subsets of computer instructions; and
- combining the retrieved subsets of computer instructions to generate the set of computer instructions that implements the requested logical operation.

75. The computer-readable medium of claim 74 wherein each term has a corresponding coefficient, wherein the logical operation represents a set of coefficients for the equation, and wherein determining which generated subsets of computer instructions are needed makes the determination based on the set of coefficients.

76. The computer-readable medium of claim 75 including generating a coefficient table, and wherein determining which generated subsets of computer instructions are needed includes the step of retrieving the set of coefficients from the coefficient table based on requested logical operation.

77. The computer-readable medium of claim 76 wherein generating the coefficient table includes:

for each set of coefficients,
determining a logical operation that the set of coefficients represents; and
storing the set of coefficients in the coefficient table.

78. The computer-readable medium of claim 74 wherein the specified equation describes all possible logical operations that can be performed on the plurality of inputs, and wherein the number of terms of the specified equation is less than the total number of possible logical operations.

79. The computer-readable medium of claim 74 wherein the specified equation is $$F(S_1, S_2, D) = \alpha_0 \cdot 1 \oplus \alpha_1 \cdot S_1 \oplus \alpha_2 \cdot s_2 \oplus \alpha_3 \cdot D \oplus \alpha_4 \cdot S_1 s_2 \oplus \alpha_5 \cdot S_1 S \oplus \alpha_6 \cdot S_2 D \oplus \alpha_7 \cdot S_1 S_2 D$$

wherein $\alpha_0 \ldots \alpha_7$ are logical operation-specific coefficients of the equation, where $\oplus$ represents the Boolean exclusive-OR operator, where $\cdot$ and juxtaposition represent the Boolean AND operator, where logical 1, $S_1, \ldots, S_1 S_2 D$ are terms of the equation, and where $S_1$, $S_2$, and D are bitmaps representing the plurality of input.

80. The computer-readable medium of claim 74 wherein the specified equation is the Boolean equation $$F(S_1, S_2, D) = \lambda_0 S_1 S_2 D + \lambda_1 S_1 S_2 D' + \lambda_2 S_1 S_2' D + \lambda_3 S_1 S_2' D' + \lambda_4 S_1' S_2 D + \lambda_5 S_1' S_2 D' + \lambda_6 S_1' S_2' D + \lambda_7 S_1' S_2' D'$$

wherein $\lambda_0 \ldots \lambda_7$ are logical operation-specific coefficients of the equation, where + represents the Boolean inclusive-OR operator, where juxtaposition represents the Boolean AND operator, where ' represents the Boolean complement operator, and where $S_1$, $S_2$, and D are bitmaps representing the plurality of input.

81. The computer-readable medium of claim 74 wherein the generated subsets of computer instructions include alternative subsets of computer instructions for each term of the specified equation and wherein the alternative subsets of computer instructions are optimized to be a first subset of computer instructions of the combined subsets of computer instructions.

82. The computer-readable medium of claim 81 wherein the generated subsets of computer instructions store a value of the term directly in the result register without performing a Boolean operation on previous contents of the result register.

83. The computer-readable medium of claim 74 wherein each input has a plurality of bits, and including combining the generated set of computer instructions with computer instructions which are common to all logical operations, the common computer instructions being used to control looping through the bits of the input.

84. The computer-readable medium of claim 83 wherein the common computer instructions are optimized to load only the input required by the requested logical operation.

85. The computer-readable medium of claim 83 wherein the common computer instructions are optimized to validate only the input required by the requested logical operation.

* * * * *

UNITED STATES PATENT AND TRADEMARK OFFICE
CERTIFICATE OF CORRECTION

PATENT NO.    : 5,604,850
DATED         : February 18, 1997
INVENTOR      : Charles Whitmer It is certified that errors appear in the above identified patent and that said Letters Patent is hereby corrected as shown below:

In column 15, claim 31, line 12, following "$S_2$", (3rd occurrence), delete 'S' and insert --'D'--

In column 16, claim 35, line 4, following "computer", please delete ",".

In column 22, claim 70, line 3, following "$S_1$", please delete "$S_2$" and insert --$S_2$--.

In column 23, claim 79, line 3, following "$\alpha_2$", please delete "$S_2$" and insert --$S_2$--.

In column 23, claim 80, line 4, following "D'+", please insert "$\lambda$".

Signed and Sealed this

Ninth Day of September, 1997

Attest:

BRUCE LEHMAN

Attesting Officer

Commissioner of Patents and Trademarks